United States Patent [19]

Bhatti

[11] Patent Number: 4,515,610
[45] Date of Patent: * May 7, 1985

[54] METHOD OF MAKING AND USING GLASS FIBER FORMING FEEDERS

[75] Inventor: Mohinder S. Bhatti, Newark, Ohio

[73] Assignee: Owens-Corning Fiberglas Corporation, Toledo, Ohio

[*] Notice: The portion of the term of this patent subsequent to May 8, 2001 has been disclaimed.

[21] Appl. No.: 562,947

[22] Filed: Dec. 19, 1983

Related U.S. Application Data

[63] Continuation of Ser. No. 398,536, Jul. 15, 1982, Pat. No. 4,472,248.

[51] Int. Cl.³ ............... C03B 37/095; C03B 37/08
[52] U.S. Cl. .............................. 65/2; 65/1; 65/374.12; 156/272.2; 228/242; 228/243; 228/263.19; 425/405 H; 428/590
[58] Field of Search .............. 65/1, 2, 374.12; 156/272.2; 228/242, 243, 263.19; 425/405 H; 428/590

[56] References Cited

U.S. PATENT DOCUMENTS 4,046,499  9/1977  Saito ........................... 425/405 H
4,068,704  1/1978  Wittmoser .................. 425/405 H X
4,097,977  7/1978  Pollner ....................... 425/405 H X
4,342,577  8/1982  Bhatti et al. ............................ 65/1
4,342,578  8/1982  Bhatti et al. ............................ 65/1
4,343,636  8/1982  Bhatti ..................................... 65/1
4,351,858  9/1982  Hunold et al. ...................... 427/193

OTHER PUBLICATIONS

Hot Isostatic Processing MCIC-77-34 Battelle Labs., Columbus, Ohio, Nov. 1977, pp. 1-99.

Primary Examiner—Robert Lindsay
Attorney, Agent, or Firm—Ronald C. Hudgens; Robert F. Rywalski; Greg Dziegielewski

[57] ABSTRACT

A method of making an orificed discharge wall for supplying a plurality of streams of molten inorganic material to be attenuated into filaments comprising inserting elements in apertures in a member; sealing said elements and member within a coating adapted to isostatically transmit pressure to said assembly; applying isostatic pressure to the hermetically sealed elements and member to mechanically seal the elements to the member; and heating the mechanically sealed elements and member to fuse the elements to the member to prevent the unwanted passage of molten glass between said elements and said member, said elements having an orifice to permit the passage of molten glass therethrough to establish said streams.

5 Claims, 3 Drawing Figures

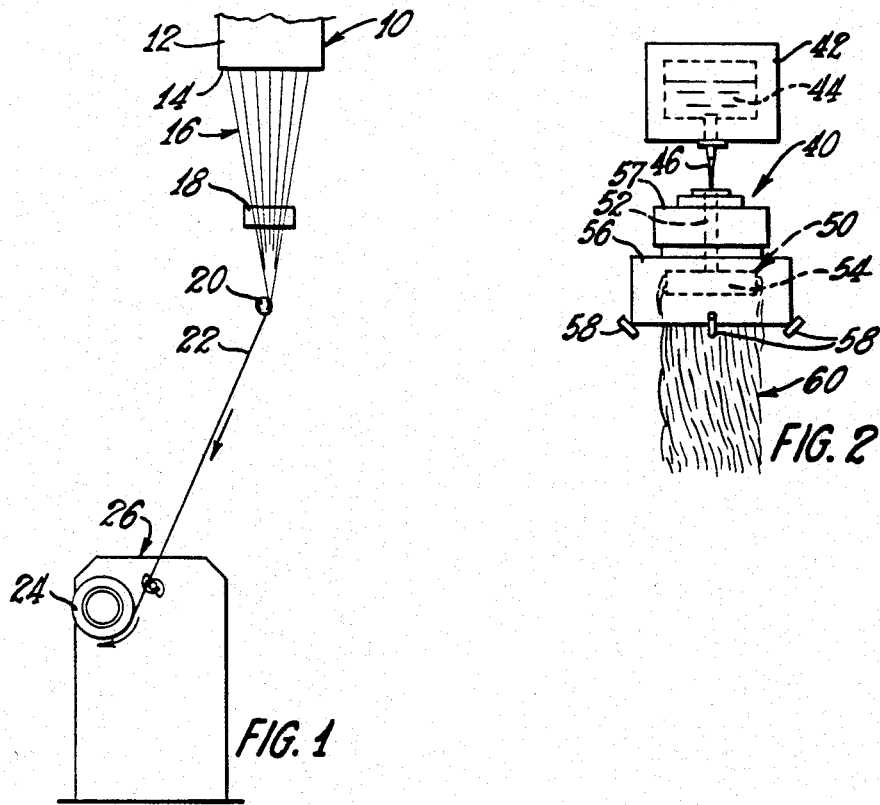
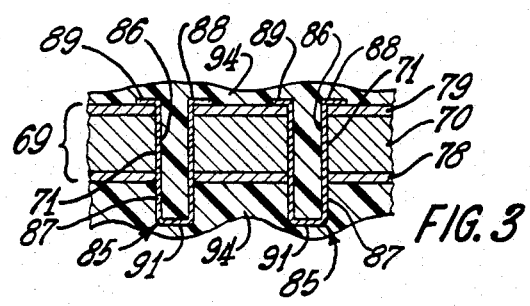
FIG. 1
FIG. 2
FIG. 3

METHOD OF MAKING AND USING GLASS FIBER FORMING FEEDERS

This is a continuation of application Ser. No. 398,536, filed July 15, 1982, now U.S. Pat. No. 4,472,248 granted May 8, 1984.

TECHNICAL FIELD

The invention disclosed herein relates to the production of glass fibers and glass fiber forming feeders.

BACKGROUND ART

With the production of glass fiber forming feeders having an ever-increasing number of orifices or tips to supply the streams of molten material to be attenuated into filaments, the need for effective and efficient systems for attaching the orificed tips or elements in the apertures in the discharge wall has also increased. Previously, the individual projections or tips were welded to the discharge wall by conventional welding techniques, such as cold resistance welding, electron beam welding, and laser welding and the like. In essence, each of these systems welded a single tip at a time. With fiber forming feeders having as many as 4,000 or more tips, the welding process can be quite time consuming. Further, there are other problems associated with the systems which are well known in the art.

DISCLOSURE OF THE INVENTION

This invention pertains to a method of making an orificed discharge wall for supplying a plurality of streams of molten inorganic material to be attenuated into filaments comprising: inserting elements in apertures in a member; hermetically sealing said elements and member within a coating adapted to isostatically transmit pressure to said member and elements; applying isostatic pressure to the hermetically sealed elements and member to mechanically seal the elements to the member; and heating the mechanically sealed elements and member to fuse the elements to the member to prevent the unwanted passage of molten glass between said elements and said member, said elements having an orifice to permit the passage of molten glass therethrough to establish said streams.

BRIEF DESCRIPTION OF THE DRAWINGS

FIG. 1 is a semi-schematic front elevational view of a glass textile type fiber forming system.

FIG. 2 is a semi-schematic front elevational view of a glass wool or rotary fiber forming system.

FIG. 3 is an enlarged cross-sectional view of the discharge wall of the feeder shown in FIG. 1.

BEST MODE OF CARRYING OUT THE INVENTION

As shown in FIG. 1, feeder 10, which is comprised of containment or sidewalls 12 and an orificed bottom or discharge wall 14, is adapted to provide a plurality of streams of molten inorganic material, such as glass, through a plurality of orificed elements 85. Feeder 10, including discharge wall 14, is adapted to be electrically energized, to heat the glass therein. The streams of molten glass can be attenuated into filaments 16 through the action of winder 26 or any other suitable means.

As is known in the art, size applicator means 18 is adapted to provide a coating or sizing material to the surface of the glass filaments which advance to gathering shoe or means 20 to be collected as an advancing strand or bundle 22. Strand 22 is then wound into package 24 upon a collet of winder 26 as is known in the art. Thus, FIG. 1 schematically represents a "textile" fiber forming system.

As shown in FIG. 2, rotary system 40 is comprised of a flow means or channel 42 having a body of molten inorganic material 44, such as glass, therein. A stream of molten glass 46 is supplied to rotary feeder or rotor 50 from channel 42, as is known in the art.

Rotor 50, which is adapted to be rotated at high speeds, is comprised of a quill 52 and a circumferential fiberizing or discharge wall 54 having a plurality of orificed elements 85 adapted to supply a plurality of streams of molten inorganic material to be fiberized. Such elements may be flush with the exterior surface of the wall or project outwardly therefrom.

In conjunction with rotor 50, a shroud 56 and circumferential blower or fluidic attenuation means 57 are adapted to fluidically assist in the attenuation of the streams of molten material into fibers or filaments 60. A binder material or coating may be applied to fiber 60 by means of binder applicators 58 as is known in the art.

As is shown in the drawings, member 69 of the fiberization or discharge walls 14 or 54 of the feeders 10 and 50, respectively, may be based upon a laminate comprised of a refractory metal core 70 having an oxygen impervious, precious metal sheath intimately bonded thereto by hot isostatic pressing (i.e., HIP) as is disclosed in my patent application Ser. No. 200,677, filed on Oct. 27, 1980, which is hereby incorporated by reference. Or, member 69 may be comprised entirely of any suitable material, such as a platinum and rhodium alloy which, for example, is well known in the art.

Regarding the laminated member, such refractory metals are selected from the group of materials consisting of molybdenum (Mo), columbium (Cb), tungsten (W), rhenium (Re), tantalum (Ta), hafnium (Hf), titanium (Ti), chromium (Cr), zirconium (Zr), vanadium (V), and base alloys of such refractory metals. For example, an alloy of molybdenum, titanium and zirconium, known as TZM, has been shown to provide a superior laminated wall for a fiber forming feeder when clad with a precious metal alloy of platinum and rhodium.

Particularly, the precious metals for first layer 78, second layer 79 and/or elements 85 are selected from a group consisting of platinum (Pt), paladium (Pd), iridium (Ir), osmium (Os), rhodium (Rh), ruthenium (Ru), and alloys based on such metals. Included in the platinum alloys are H alloy and J alloy which are alloys of platinum and rhodium of 90%/10% and 75%/25% composition, respectively. In essence, the laminate is comprised of a plurality of layers of material wherein one of said layers is a refractory metal, and another of said layers is an oxygen impervious, precious metal, said plurality of layers being intimately bonded together by the application of isostatic pressure and heat to form a unitary laminate.

FIG. 3 depicts a portion of a discharge wall at a point during fabrication according to the principles of this invention. As such, elements or tips 85 are positioned in or inserted in a plurality of apertures 71 located in member 69. Then a coating 94 is applied to the assembled member 69 and elements 85 to hermetically seal the elements and member therewithin. The coating or material 94 must be capable of isostatically transmitting fluidic pressure to member 69 and elements 85, and the coating material must prevent the migration of the working fluid in the pressing unit, either CIP or HIP, between the mating surfaces of member 69 and elements 85. As will be explained later herein, when cold isostatic pressing (CIP) is employed, such coating materials are preferably elastomers.

Then, isostatic pressure is applied to the sealed, that is coated, assembly sufficient to mechanically seal or join the elements 85 to member 69. With the subsequent application of heat, the mechanically sealed elements and member are fused together to prevent the unwanted passage of molten glass between the elements 85 and member 69 of discharge walls 14 and 54.

A glass fiber forming feeder discharge wall 14 was fabricated from a platinum-rhodium alloy plate or member 69 and a plurality of platinum-rhodium alloy elements or tips 85. As such, member 69 contained 800 apertures which each received an element 85. Each of the elements or tips 85 were comprised of a sleeve 87 and a flange 89. An orifice 86 within sleeve 87 extended from first end 88 at flange 89 to a second end 91 along sleeve 87. As shown in FIG. 3, second end 91 was closed. However, it is to be understood that tips 85 may be supplied with an open second end 91 such that orifice 86 extends completely through element 85.

The elements 85 were inserted into aperture 71 of member 69 such that flange 89 was in abutting engagement with one side of member 69 and such that a portion of sleeve 87, including second end 91, extended beyond the opposite side of member 69.

The loose assembly of elements 85 and member 69 was then dipped in a liquid bath of polyvinylchloride (PVC) to coat the exposed surfaces of elements 85 and member 69 and to fill orifices 86 of element 85. After the application of the liquid coating, a slight vacuum was applied to assist in the complete filling of the orifices 86 with the elastomeric material. The PVC was then cured or solidified to seal elements 85 and member 69 against the migration of the working fluid in the pressing unit therebetween.

The coated assembly was then placed in the oil bath of a cold isostatic pressing (CIP) unit, and a pressure of about 150,000 psi was briefly exerted on the coated assembly to mechanically seal or join the elements to the member. Since cold isostatic pressure or pressing was employed, the operation was carried forth at approximately room temperature.

Subsequent to the application of isostatic pressure in the CIP unit, the elastomeric coating 94 was slit and removed from member 69 and elements 85. Then the sub-assembly, comprised of the mechanically sealed elements and member 69, was placed in a heating means or furnace and heated to a temperature of about 1200° C. for about one hour to fuse the elements to the member to form the discharge wall such that during subsequent operation as a fiber forming feeder the molten glass is prevented from flowing between the elements and the member.

The second ends 91 of elements 85 may then be machined to open orifice 86, if necessary, and sidewalls, and the like, normally associated with fiber forming feeders are joined to the discharge wall to form a fiber forming feeder.

If the orifices 86 are not completely filled with the pressure transmitting media 94, the sleeves 87 may collapse upon the application of the pressure. Also, if the refractory metal laminate is employed, the fusion step should be performed in a vacuum, such as in a vacuum annealing furnace, or in an inert atmosphere to prevent the possibility of oxidizing the core of the laminate prior to the fusion of the precious metal layers and the elements.

Although in the foregoing example, the member 69 was completely encased within the pressure transmitting coating 94, it is only necessary that the elements 85 and that portion of member 69 associated therewith be heremetically sealed by the coating. That is, other portions of member 69 may be left uncoated.

Alternatively, a thermoplastic material, such as a suitable glass, may be employed as the coating material 94. However, since most glasses are brittle at room temperature, the application of heat and isostatic pressure should take place simultaneously at a temperature at which the glass becomes pliable and capable of transmitting the pressure applied thereto isostatically to the member and elements. As such, the application of isostatic pressure and heat should be performed in a hot isostatic pressing (HIP) unit. Also, it may be desireable to suitably preheat the assembly sealed in the glass coating to a suitable softening temperature prior to any substantial application of pressure to prevent the fracture of the glass coating by the pressure.

In either case, the coating material should not be too fluid or pliable. That is, the coating 94 should be sufficiently viscous to prevent the flow of the coating between the elements 85 and member 69 which may prevent the effective sealing of elements 85 to member 69.

According to the foregoing procedures, if a tip 85 as shown in FIG. 3 is employed, the flange 89 will be fused to one surface of member 69 and sleeve 87 will be fused to the portion of member 69 defining the apertures 71 associated therewith. Further, if the refractory metal/precious metal laminate is employed as member 69, the sleeve 87 of element 85 will fuse to core 70 and layers 78 and 79 to seal the refractory metal within a protective layer of oxygen impervious, precious metal to prevent the oxidation of the refractory metal at elevated temperatures.

Also, it is to be understood that element 85 may be of any suitable shape, and, in particular, flange 89 may be dispensed with and/or the length of sleeve 87 may also be substantially equal to the thickness of member 69 to provide a tipless orifice plate having orifices lined with a suitable material fused to the member 69.

To provide an effective mechanical seal between the elements and member in the isostatic pressing step, it is preferred that the isostatic pressure applied be greater than or equal to the yield point of the material of the elements 85 at the temperature employed for the pressing step.

From the foregoing, it can be seen that the present invention is applicable to the joining of the precious metal elements to the laminated walls or members as disclosed in, for example, U.S. patent application Ser. No. 200,676 filed Oct. 27, 1980, now U.S. Pat. No. 4,342,577, issued Aug. 3, 1982 in the names of Mohinder S. Bhatti and Alfred Marzocchi; and/or U.S. patent application Ser. No. 255,987 filed Apr. 20, 1981 in my name, now U.S. Pat. No. 4,343,636, issued Aug. 10, 1982, which are hereby incorporated by reference.

It is apparent that within the scope of the present invention, modifications and different arrangements can be made other than as herein disclosed. The present disclosure is merely illustrative, with the invention comprehending all variations thereof.

INDUSTRIAL APPLICABILITY

The invention disclosed herein is readily applicable to the formation of continuous and/or staple glass filaments.

I claim:

1. In a method of making glass filaments wherein a plurality of streams of molten glass issuing from an orificed discharge wall of a feeder are attenuated into said filaments, the improvement comprising said discharge wall being fabricated by:

positioning elements in apertures in a member;

providing a layer of elastomeric material about said member and elements positioned therein, said layer being capable of transmitting pressure isostatically and being effective to prevent the migration of working fluid of an after-defined pressing unit between the member and elements;

locating said member and elements having said layer thereabout within a pressing unit having a body of working therein;

applying isostatic pressure to the layers containing said elements and member to mechanically seal the elements to the member; and heating the mechanically sealed elements and member to fuse the elements to the member to prevent the unwanted passage of molten glass between said elements and said member, said elements having an orifice to permit the passage of molten glass therethrough to establish said streams.

2. A method of making an orificed discharge wall for supplying a plurality of streams of molten inorganic material to be attenuated into filaments comprising:

positioning elements in apertures in a member;

providing a sealed layer of elastomeric material around said member and elements positioned therewithin adapted to isostatically transmit pressure to said elements and member;

applying isostatic pressure to the sealed layer containing said elements and member to mechanically seal the elements to the member, and heating the mechanically sealed elements and member to fuse the elements to the member to prevent the unwanted passage of molten glass between said elements and said member, said elements having an orifice to permit the passage of molten glass therethrough to establish said streams.

3. The method of claim 2 wherein the pressure is applied approximately at room temperature and the pressure is greater than or equal to the yield point of the material of the elements at such temperature.

4. The method of claim 1 wherein said elements and member are cold isostatically pressed together.

5. An article for fabrication into a glass fiber forming feeder comprising:

a member having a plurality of elements positioned in apertures therein; and a layer of elastomeric material positioned around said member and elements sealing said elements and at least a portion of said member to permit the application of isostatic pressure thereto to mechanically seal the elements to the member.

* * * * *